US008360139B2

(12) United States Patent
Inatomi et al.

(10) Patent No.: US 8,360,139 B2
(45) Date of Patent: Jan. 29, 2013

(54) CERAMICS HEAT EXCHANGER

(75) Inventors: Takanari Inatomi, Yokohama (JP);
Yasuhiro Sakai, Yokohama (JP);
Shigeki Maruyama, Yokohama (JP);
Shoko Suyama, Yokohama (JP);
Ryutaro Hino, Ibaraki-Ken (JP);
Atsuhiko Terada, Ibaraki-Ken (JP);
Kaoru Onuki, Ibaraki-Ken (JP); Shinji Kubo, Ibaraki-Ken (JP); Seiji Kasahara, Ibaraki-Ken (JP)

(73) Assignees: Kabushiki Kaisha Toshiba, Tokyo (JP);
Japan Atomic Energy Agency, Naka-Gun (JP)

( * ) Notice: Subject to any disclaimer, the term of this patent is extended or adjusted under 35 U.S.C. 154(b) by 876 days.

(21) Appl. No.: 11/914,240

(22) PCT Filed: May 12, 2006

(86) PCT No.: PCT/JP2006/309567
§ 371 (c)(1),
(2), (4) Date: Feb. 15, 2008

(87) PCT Pub. No.: WO2006/121158
PCT Pub. Date: Nov. 16, 2006

(65) Prior Publication Data
US 2009/0056924 A1   Mar. 5, 2009

(30) Foreign Application Priority Data

May 13, 2005   (JP) .............................. P2005-141767

(51) Int. Cl.
| F28D 7/10 | (2006.01) |
| F28D 7/02 | (2006.01) |
| F28F 7/00 | (2006.01) |
| F28F 9/02 | (2006.01) |
| F28F 9/00 | (2006.01) |

(52) U.S. Cl. ............ 165/157; 165/69; 165/76; 165/158; 165/81; 165/82; 165/162; 165/164; 165/905

(58) Field of Classification Search .................... 165/69, 165/76, 81, 82, 157, 158, 162, 164, 905; 29/890.03
See application file for complete search history.

(56) References Cited

U.S. PATENT DOCUMENTS 2,201,684 A * 5/1940 Kingsbury ................... 432/264
2,821,369 A * 1/1958 Hilliard ........................ 165/159
(Continued)

FOREIGN PATENT DOCUMENTS

| JP | 61-256195 | 11/1986 |
| JP | 2-45120 | 10/1990 |
| JP | 2005-61785 | 3/2005 |

OTHER PUBLICATIONS

J.P. Gupta, Fundamentals of Heat Exchanger and Pressure Vessel Technology, 1986, Hemisphere Publishing Corporation, Sections 1.97-1.100, 9.91-9.98, 9.124-9.128.*

(Continued)

Primary Examiner — Henry Yuen
Assistant Examiner — Ian Soule
(74) Attorney, Agent, or Firm — Oblon, Spivak, McClelland, Maier & Neustadt, L.L.P.

(57) ABSTRACT

A ceramic heat exchanger includes a heat exchange section that heat-exchanges between two fluids A and B flowing opposite directions to each other. The heat exchange section includes ceramic blocks stacked one on top of another with a seal therebetween. The ceramic blocks have a plurality of parallel lines of flow channels, each line defined by the flow channels through which the same fluid flows, any two adjacent lines being defined by the flow channels through which the different fluids A and B flow respectively. Both ends in the stacking direction of the stack are bound to join and integrate the ceramic blocks with tightening means including end plates and a tie rod. A thermal expansion absorber is disposed on an external surface of the end plates for absorbing thermal expansion in the axial direction of the tie rod.

6 Claims, 13 Drawing Sheets

U.S. PATENT DOCUMENTS

| | | | | |
|---|---|---|---|---|
| 2,859,948 A | * | 11/1958 | Callard | 165/82 |
| 3,272,260 A | * | 9/1966 | Raub et al. | 165/164 |
| 3,315,739 A | * | 4/1967 | Kearney | 165/165 |
| 4,044,825 A | * | 8/1977 | Gugenberger et al. | 165/165 |
| 4,083,400 A | * | 4/1978 | Dziedzic et al. | 165/165 |
| 4,134,449 A | * | 1/1979 | La Haye et al. | 165/83 |
| 4,279,297 A | * | 7/1981 | Dziedzic et al. | 165/165 |
| 4,333,522 A | * | 6/1982 | Brune | 165/69 |
| 4,850,426 A | * | 7/1989 | Fayolle et al. | 165/111 |
| 4,934,453 A | * | 6/1990 | Ganz et al. | 165/165 |
| 5,209,906 A | * | 5/1993 | Watkins et al. | 422/200 |
| 6,892,797 B2 | * | 5/2005 | Beddome et al. | 165/81 |
| 2005/0056410 A1 | | 3/2005 | Ishiyama et al. | |

OTHER PUBLICATIONS

Harold A. Rothbart, Mechanical Design and Systems Handbook, 1985, McGraw-Hill Book Company, Second Edition, Section 23.3.2.*

* cited by examiner

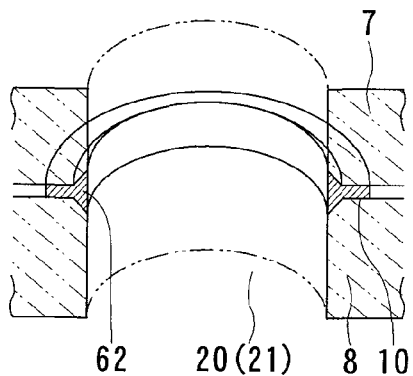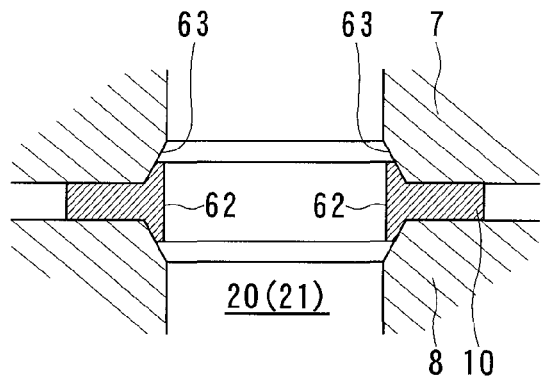
FIG. 18A  FIG. 18B
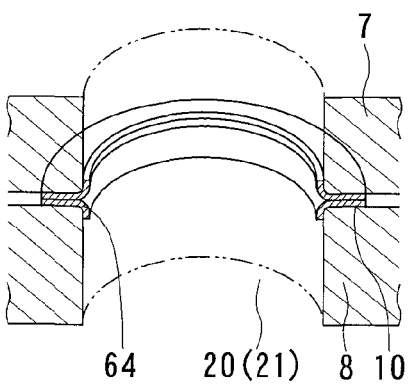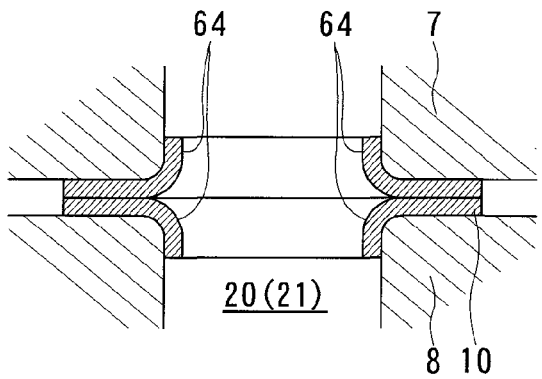
FIG. 19A  FIG. 19B

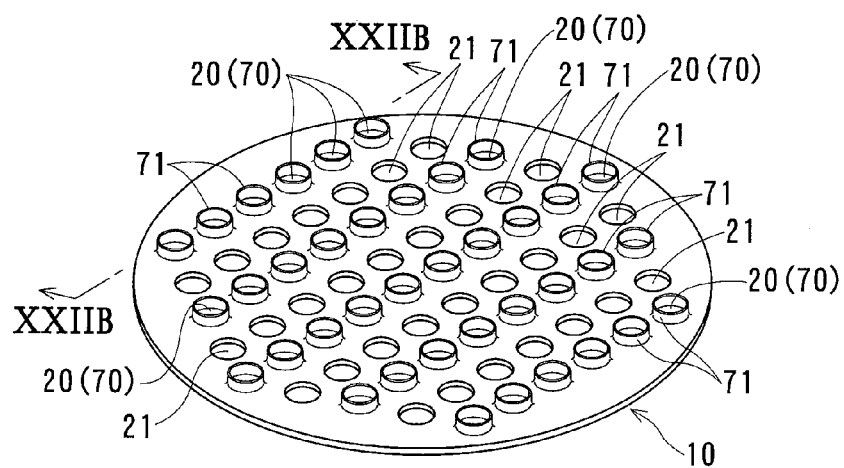
F I G. 22A
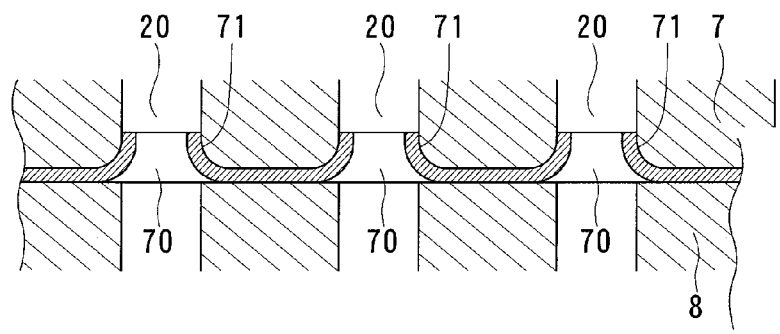
F I G. 22B
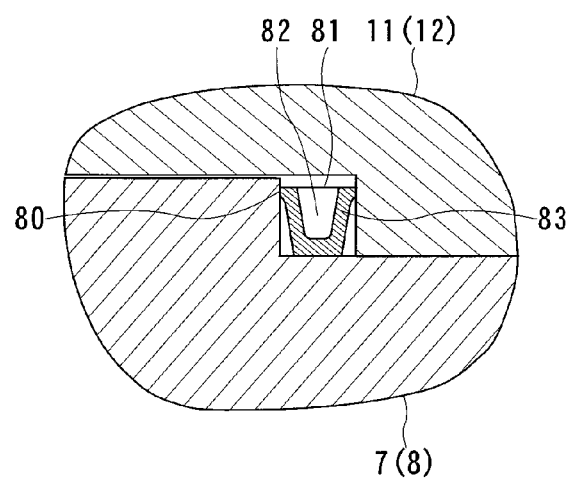
F I G. 23

CERAMICS HEAT EXCHANGER

TECHNICAL FIELD

The present invention relates to ceramic heat exchangers used in the industries of nuclear energy, aerospace, chemicals and so forth, and particularly, relates to a heat exchanger suitable for a hydrogen production apparatus based on the thermochemical IS (iodine-sulfur) process that produces a large amount of hydrogen and oxygen from water material using nuclear heat.

BACKGROUND ART

A variety of heat exchangers are used in a wide range of industrial fields, such as nuclear industry, aerospace industry, chemical industry, and general industry. In particular, heat exchangers required to be resistant to high temperature and corrosion use a ceramic block as the heat exchange section. As an example of such heat exchange, a heat exchanger will now be described hereunder which is used in a thermochemical IS process hydrogen production apparatus for producing a large amount of hydrogen and oxygen from water material using nuclear heat of about 950° C.

The IS process basically includes the following three sub systems.

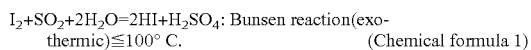
(Chemical formula 1)

$2HI=H_2+I_2$: hydrogen iodide decomposition reaction (endothermic) 400° C.

$H_2SO_4=H_2O+SO_2+½O_2$: sulfuric acid decomposition reaction (endothermic) 800° C.

The sulfuric acid decomposition and the hydrogen iodide decomposition of the three sub-systems are endothermic reactions and their systems are heated by heat exchange with, for example, high-temperature helium gas supplied from a high-temperature gas furnace in a heat exchanger.

Since sulfuric acid is corrosive to metals, the heat exchange section must be corrosion-resistant. In addition, the heat exchange section is used at high temperatures in the range of 400 to 800° C., and therefore, cannot use combinations of a polytetrafluoroethylene-based material and a metal generally used in sulfuric acid plants.

Accordingly, a sulfuric acid evaporator has been proposed in which the sulfuric acid decomposition reaction is conducted by using a ceramic block, from the viewpoint of enhancing the high-temperature corrosion resistance and the high-temperature strength (see, for example, Patent Document of Japanese Unexamined Patent Application Publication No. 2005-61785).

In this proposal, sulfuric acid of about 455° C. supplied to a lower plenum through a sulfuric acid supply pipe connected to the bottom of a pressure vessel containing high-temperature helium gas is delivered to a heat exchanging section and discharged from a sulfuric acid gas exhaust pipe through an upper plenum.

The heat exchange section includes two pairs of straight flow channels, a ceramic block having flow channels, a plurality of partition plates surrounding the ceramic block, and inner tube disposed so as to contain the partition plates.

A helium inlet nozzle extending from the pressure vessel to the inner tube is disposed at the upper side of the heat exchange section. Thus, high-temperature helium gas of about 689° C. supplied from a high-temperature heat exchange system flows into the top chamber of the heat exchange section. The high-temperature helium gas further flows through one of the flow channels of the ceramic block, meandering through chambers defined by the partition plates and the inner tube, and the heat is exchanged between the helium gas and the sulfuric acid flowing through the other flow channel. The helium gas flowing out to the pressure vessel from the bottom chamber of the heat exchange section is returned to the high-temperature heat exchange system through the helium outlet nozzle.

The ceramic block is generally produced by compacting a powder, cutting the compact to a predetermined size, and then sintering the compact. Ceramic is resistant to high temperature and suitable for use in the intended atmosphere, and is also corrosion resistant. In use for heat exchangers, it is an important factor that ceramic has a high thermal conductivity. In use for the heat exchanger of a thermochemical IS process hydrogen production apparatus using sulfuric acid, ceramic is required to have corrosion resistance to sulfuric acid and heat resistance.

In sulfuric acid plants for producing sulfuric acid or the like, which run at a low temperature of about 200° C., a corrosion-resistant material, such as polytetrafluoroethylene or glass, is coated with a metal.

In the heat exchanger for thermochemical IS process hydrogen production apparatus running at a temperature of 400° C. or more, however, polytetrafluoroethylene or the like cannot be used, and heat exchangers made of ceramic, such as silicon carbide or silicon nitride, has been proposed from the viewpoint of corrosion resistance to sulfuric acid and heat resistance. Unfortunately, ceramic is an elastic material, and has some disadvantages in use as a structural material in comparison with metals.

More specifically, first, ceramic is brittle and, accordingly, has low toughness. Consequently, a crevice extends from a point undergoing stress concentration or a tiny crack, and may result in destruction.

Second, ceramic is difficult to join. Metallurgical techniques for joining ceramic include: (1) brazing; (2) reaction sintering; and (3) pressureless sintering. In order to achieve reliable joining, a furnace is required, and the size of the materials to be joined to each other is limited by the capacity of the furnace. In addition, if a defect or uneven strength occurs at the joined portion, not only the strength is degraded, but also the above-mentioned crack extension may be caused by stress concentration.

Third, the linear expansion coefficient of ceramic is about 4E-6/° C. and is lower than metal structural materials, such as stainless steel (18E-6/° C.) and inconel (15E-6/° C.). Accordingly, a difference in thermal expansion occurs at high temperatures.

In particular, this problem is pronounced in the sulfuric acid evaporator. More specifically, the known heat exchange section disclosed in the above-cited Patent Document is produced by joining and integrating a plurality of ceramic blocks because of the limitation in forming one of the flow channels. The integrated size is limited by the capacity of the furnace for joining. An easy method, such as using adhesive, but not a furnace, does not provide a high-temperature strength as high as that of the base material. In addition, a discontinuous strength is exhibited at the junctions, and, consequently, the junctions may be destructed by stress concentration.

Furthermore, one flow channel and the other flow channel are orthogonal to each other. This makes it easy to separate helium gas flowing through one of the flow channels from sulfuric acid flowing through the other. However, the orthogonal flows running through the tubular flow channels come into apparent point contact with each other and their opposing area is small. Consequently, the quantity of exchanged heat is reduced. The differences in thermal expansion between the partition plates and the ceramic blocks and between the partition plates and the inner tube may provide a problem.

Since the inner tube is fixed to an end plate made of a metal, such as stainless steel, the inner tube and the partition plates are preferably made of a metal, such as stainless steel. However, if the partition plates and the inner tube are made of, for example, stainless steel, gaps will be formed between the peripheries of the ceramic blocks and the internal circumferences of the partition plates, and helium leaks from the gaps. Consequently, the quantity of exchanged heat is reduced. In order to prevent the leakage of helium gas resulting from the thermal expansion difference, some thermal expansion absorber may be required to be provided.

DISCLOSURE OF INVENTION

Accordingly, the present invention was made in consideration of the above circumstances and an object of the present invention is to provide a ceramic heat exchanger exhibiting high heat exchange efficiency and structural reliability even though a corrosive fluid, such as sulfuric acid, flows at a high temperature.

In order to accomplish the object, the present invention provides a ceramic heat exchanger including a heat exchange section that heat-exchanges between fluids A and B flowing in the directions in which fluids A and B oppose to each other. The heat exchange section includes a plurality of ceramic blocks stacked one on top of another with a seal therebetween. The stack of the ceramic blocks has a plurality of parallel lines of flow channels formed therein. Each line is defined by the flow channels through which the same fluid A or B flows and any two adjacent lines are defined by the flow channels through which the different fluids A and B flow respectively. Both ends in the stacking direction of the stack are bound to join and integrate the ceramic blocks with tightening means including end plates and a tie rod. The end plates are provided with a thermal expansion absorber on an external surface thereof for absorbing the thermal expansion in the axial direction of the tie rod.

In a preferred embodiment of the ceramic heat exchanger according to the above aspect, the ceramic blocks each may have a junction end at which the ceramic blocks are joined, and at least one of the junction ends has a tapered portion whose diameter gradually increases toward the end. The tapered portion has a tapered ring fitted to the periphery thereof and a flange disposed around the tapered ring. The flange has a step on which an edge of the tapered ring is seated. Such flanges are bound to each other with a plurality of tie rods.

In another embodiment, the ceramic blocks are stacked one on top of another with a disassemblable seal therebetween. The stack of ceramic blocks has end plats on the external surfaces, and the end plates are bound to each other with a plurality of tie rods to join and integrate the ceramic blocks. Spacers made of a material in the same series as the material of the tie rods or a material having a higher thermal expansion coefficient than the tie rods are disposed each between the end plates and the ends of the tie rods.

In another embodiment, the ceramic blocks are stacked one on top of another with a disassemblable seal therebetween. The stack of ceramic blocks has end plats on the external surfaces, and the end plates are bound to each other with a plurality of tie rods to join and integrate the ceramic blocks. Each end plate is a stack of a plurality of plates having different thermal expansion coefficients with sealing members therebetween.

In another embodiment, the heat exchange section includes ceramic blocks having a large-diameter head at a predetermined position of their end in the axial direction. The heat exchange section further includes a sealing member abutted on the large-diameter head, springs pressing the sealing member against the large-diameter head, and a helium inlet container having a bellows disposed around the sealing member and the springs and absorbing thermal expansion difference in the axial direction.

In another embodiment, the ceramic blocks are stacked one on top of another with a disassemblable seal therebetween. The stack of ceramic blocks has end plats on the external surfaces, and the end plates are bound to each other with a plurality of tie rods to join and integrate the ceramic blocks. The seal is disposed around at least either the flow channels for fluid A or the flow channels for fluid B.

In another embodiment, the ceramic blocks are stacked one on top of another with a disassemblable seal therebetween. The stack of ceramic blocks has end plats on the external surfaces. The end plates are bound to each other with a plurality of tie rods to join and integrate the ceramic blocks. The seal is a perforated plate having holes communicating with the flow channels for fluids A and B.

In still another embodiment, the end plates are disposed at both ends of the stack of the ceramic blocks having a plurality of flow channels extending in the axial direction with a seal between the ceramic blocks. The end plates are bound to each other with a plurality of tie rods to tighten and join the ceramic blocks. Steps that are engaged with each other with a predetermined difference in diameter are formed at a junction of the end plates and the ceramic blocks. The steps define a space therebetween in which a sealing ring having an opening in the axial direction is placed.

The above-described ceramic heat exchanger of the present invention includes a heat exchange section that heat-exchanges between fluids A and B flowing in the direction in which the fluids oppose each other. The heat exchange section includes a plurality of ceramic blocks stacked one on top of another with a seal therebetween. Both ends in the stacking direction of the stack are bound to join and integrate the ceramic blocks with tightening means including end plates and a tie rod. The end plates are provided with a thermal expansion absorber on their external surface for absorbing the thermal expansion in the axial direction of the tie rod. Thus, the stack of the ceramic blocks can be prepared in a desired size according to the capacity of heat exchange independent of manufacturing equipment, such as a sintering furnace, by stacking the ceramic blocks with a seal therebetween. Also, since the ceramic blocks are joined and integrated using a thermal expansion absorber, sealing can be ensured even though a thermal expansion difference is produced between the ceramic blocks and the tie rods at a high temperature. Consequently, the ceramic heat exchanger of the present invention exhibits high heat exchange efficiency and structural reliability even though a corrosive fluid, such as sulfuric acid, flows at a high temperature.

BRIEF DESCRIPTION OF THE DRAWINGS

FIG. 18A is a representation of a modification of the seal according to the sixth embodiment of the present invention; and FIG. 18B is an enlarged view of the main parts around the seal shown in FIG. 18A.

FIG. 19A is a representation of another modification of the seal according to the sixth embodiment of the present invention; and FIG. 19B is an enlarged view of the main parts of FIG. 19A.

FIG. 22A is a representation of an example of the seal of a ceramic heat exchanger according to a modification of the seventh embodiment of the present invention; and FIG. 22B is a sectional view taken along the line XXIIB-XXIIB of FIG. 22A.

FIG. 23 is an enlarged sectional view of the sealing structure of a ceramic heat exchanger according to an eighth embodiment of the present invention.

BEST MODE FOR CARRYING OUT THE INVENTION

Ceramic heat exchangers according to some embodiments of the present invention will now be described with reference to the drawings. The following embodiments illustrate ceramic heat exchangers of a hydrogen production apparatus based on the thermochemical IS process for producing a large amount of hydrogen and oxygen from water using nuclear heat.

First Embodiment

FIGS. 1 to 8

Figure 1:
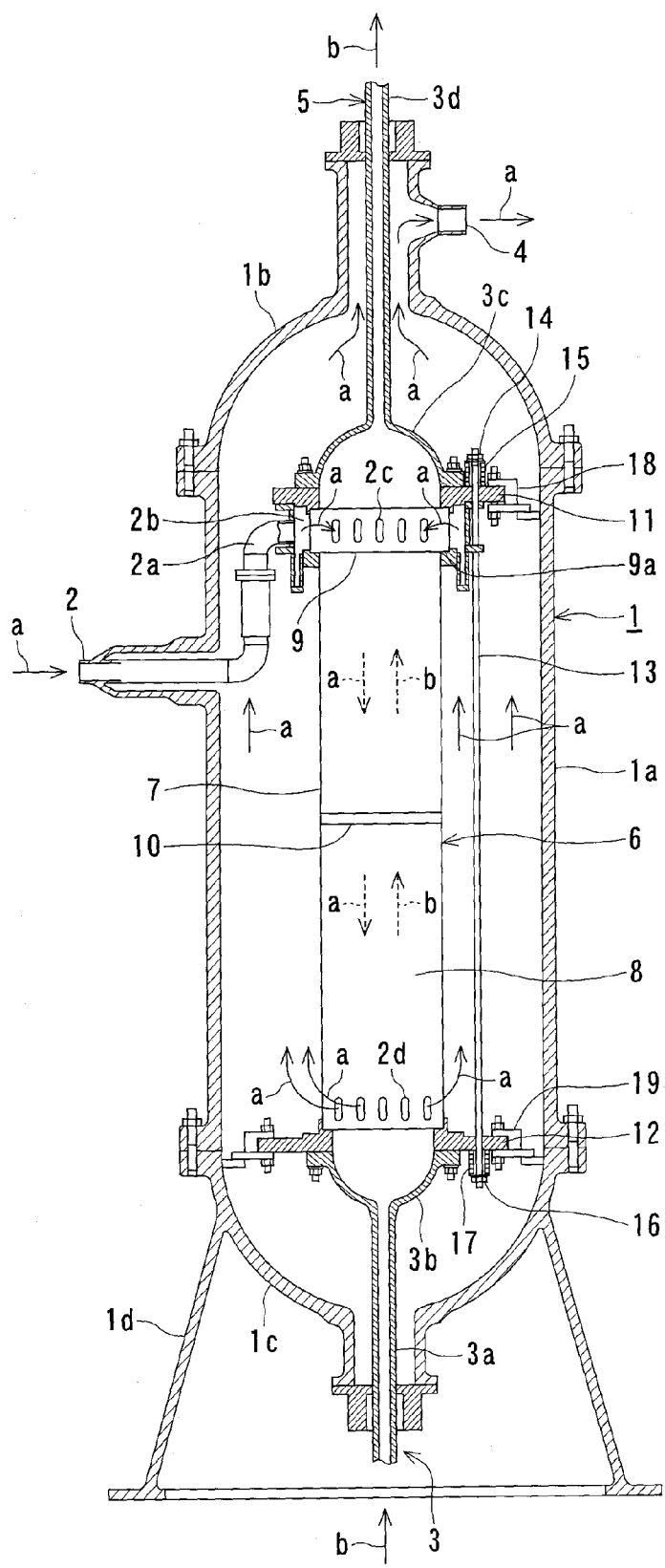
FIG. 1 is a sectional view of a ceramic heat exchanger according to a first embodiment of the present invention.

FIG. 1 is a general view of the structure of a ceramic heat exchanger according to a first embodiment of the present invention. The overall structure of the ceramic heat exchanger of a thermochemical IS process hydrogen production apparatus will be described hereunder with reference to FIG. 1.

As shown in FIG. 1, the ceramic heat exchanger of the present embodiment has a vertically oriented cylindrical pressure vessel 1. The pressure vessel 1 is a gas-tight enclosure including, for example, a barrel 1a and a hemispherical upper mirror portion 1b and lower mirror portion 1c disposed at the top and bottom of the barrel. The lower mirror 1c has a skirt-like support 1d. The support 1d fixes the pressure vessel 1 upright to a predetermined position on an installation floor.

A helium inlet nozzle 2 through which high-temperature helium gas a, or a first heat exchange fluid, is introduced is provided at an upper position in the wall of the barrel 1a of the pressure vessel 1. A helium supply pipe (not shown) is connected to the external portion of the helium inlet nozzle 2. The internal portion of the helium inlet nozzle 2 is connected to a curved helium introduction pipe 2a. The helium introduction pipe 2a is guided to the upper space side in the inside of the pressure vessel 1 and connected to a helium inlet container 2b. The helium inlet container 2b is connected to a helium entrance 2c of a heat exchange section 6 (described later), so that the helium gas "a" flows downward in the heat exchange section 6.

The lower mirror portion 1c of the pressure vessel 1 is provided with a sulfuric acid introduction portion 3 through which sulfuric acid "b" being a second heat exchange fluid is introduced. A sulfuric acid supply pipe (not shown) is connected to the external portion of the sulfuric acid introduction portion 3. The internal portion of the sulfuric acid introduction portion 3 is connected to a perpendicular sulfuric acid introduction pipe 3a. The sulfuric acid introduction pipe 3a is connected to a lower plenum 3b disposed at the bottom side of the pressure vessel 1. The lower plenum 3b is connected to the heat exchange section 6 so that the sulfuric acid "b" flows upward in the heat exchange section 6.

The upper mirror portion 1b of the pressure vessel 1 has a helium outlet nozzle 4 at an upper position through which the helium gas "a" is discharged after heat exchange. The helium gas "a" flows downward in the heat exchange section 6 to be heat-exchanged with sulfuric acid "b" and is then discharged from the heat exchange section 6 through the helium outlet 2d to the inside of the pressure vessel 1. The helium gas "a" flows upward and is conducted to the helium outlet nozzle 4 in the pressure vessel 1. Thus, the helium gas "a" is discharged to the outside and returned to a helium gas supply section (not shown).

In addition, the upper mirror portion 1b of the pressure vessel 1 has a sulfuric acid exhaust portion 5 at an upper position through which sulfuric acid "b" is discharged after heat exchange. The sulfuric acid "b" flowing upward in the heat exchange section 6 is turned into gas by heat exchange with the helium gas "a". The sulfuric acid gas is conducted to the helium outlet nozzle 4 through the upper plenum 3c and thus discharged to the outside through a sulfuric acid gas exhaust pipe 3d and delivered to a sulfuric acid processing section (not shown).

The heat exchange section 6 for heat-exchanging between the first fluid, or helium gas "a", and the second fluid, or sulfuric acid "b", is disposed at the middle inside the pressure vessel 1. The heat exchange section 6 is a vertically oriented cylinder defined by a plurality of, for example, two, vertically stacked ceramic blocks 7 and 8 in which many heat exchange flow channels are formed close to each other along the vertical direction. A seal 10 is provided at the junction between the upper and lower ceramic blocks 7 and 8 to seal the junction (joined portion) airtightly.

The upper end of the upper ceramic block 7 is held by a horizontally disposed metal upper end plate 11 from the upper side, and the lower end of the lower ceramic block 8 is supported by a horizontally disposed metal lower end plate 12. The upper end plate 11 and the lower end plate 12 are bound and integrated by a plurality of vertically oriented metal tie rods 13 disposed around the ceramic blocks 7 and 8.

More specifically, each tie rod 13 has a screw at the upper end. The screw protrudes upward through the upper end plate 11 and is tightened with a nut 14 acting as tightening means. Springs, such as coned disk springs or coil springs, are provided as thermal expansion absorbers 15 between the upper end plate 11 and the nuts 14 for absorbing the difference in thermal expansion between the ceramic blocks 7 and 8 and the metal tie rods 13.

In the same manner as that mentioned above, the tie rods 13 each has a screw at the lower end. The screw protrudes downward through the lower end plate 12 and is tightened with a nut 16 acting as tightening means. Springs, such as coned disk springs or coil springs, or elastic tubes are provided as thermal expansion absorbers 17 between the lower end plate 12 and the nuts 16.

The upper end plate 11 and the lower end plate 12 are secured in the pressure vessel 1 with support mechanisms 18 and 19, respectively.

As described above, the heat exchange section 6 is a stack of a ceramic upper block 7 and lower block 8 with a seal 10 therebetween. The upper block 7 integrally has a large-diameter head 9 with a step 9a at the upper end. The lower block 8 has the same diameter as that of the lower barrel of the upper block 7 so as to have a constant diameter from the top to the bottom overall.

The structure of the ceramic heat exchanger will now be described with reference to FIGS. 2 to 7.

As shown in FIGS. 2 to 7, a plurality of parallel lines (for example 9 lines) of flow channels 20 and 21 are formed in the ceramic blocks 7 and 8. Each line is defined by the flow channels 20 or 21 through which the same fluid A (helium gas "a": first fluid (outer 5 lines)) or B (sulfuric acid: second fluid (inner four lines)) flows, and any two adjacent lines are defined by the flow channels 20 and 21 through which the different fluids A and B flow respectively, in the directions in which fluids A and B oppose to each other. More specifically, the flow channels of lines A for fluid A are referred to as helium flow channels 20, and the flow channels of lines B for fluid B are sulfuric acid flow channels 21. These liens are alternately arranged.

Figure 2:
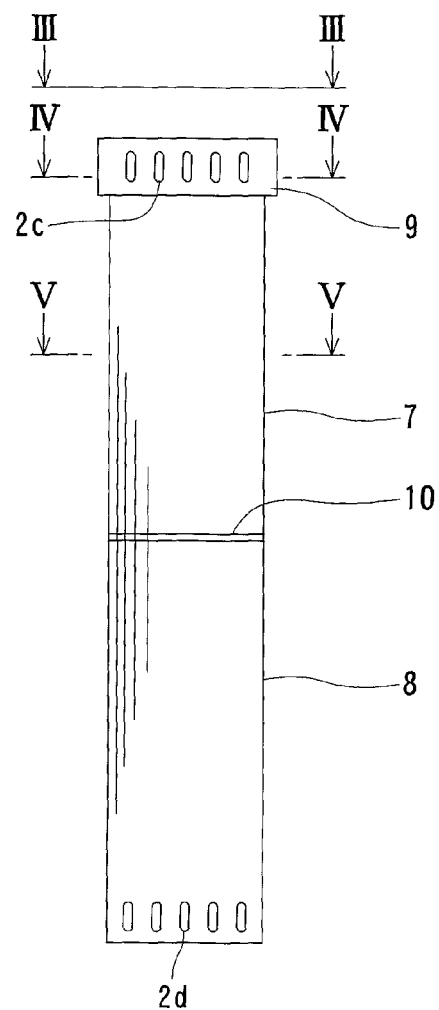
FIG. 2 is an external view of ceramic blocks of a heat exchange section according to the first embodiment of the present invention.
Figure 3:
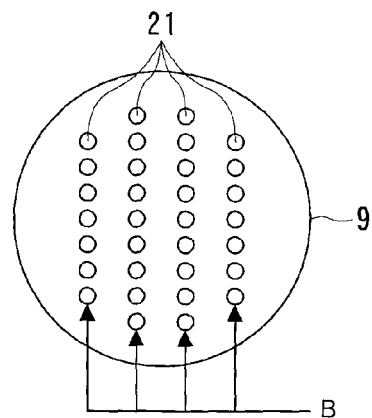
FIG. 3 is a view arrowed along the line III-III of FIG. 2.
Figure 4:
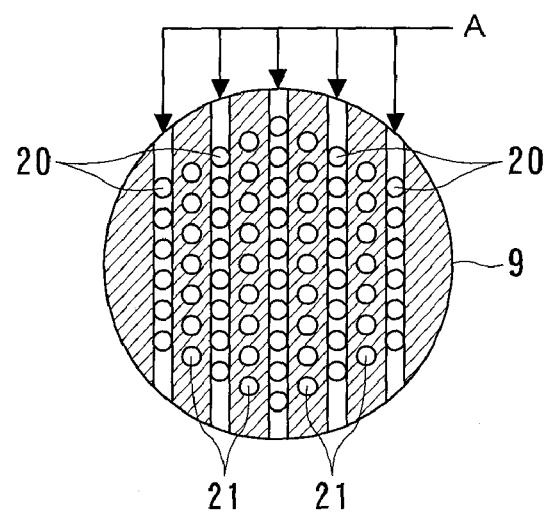
FIG. 4 is a sectional view taken along the line IV-IV of FIG. 2.
Figure 5:
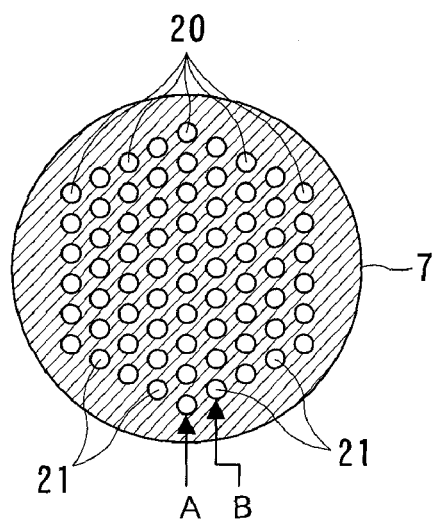
FIG. 5 is a sectional view taken along the line V-V of FIG. 2.
Figure 6:
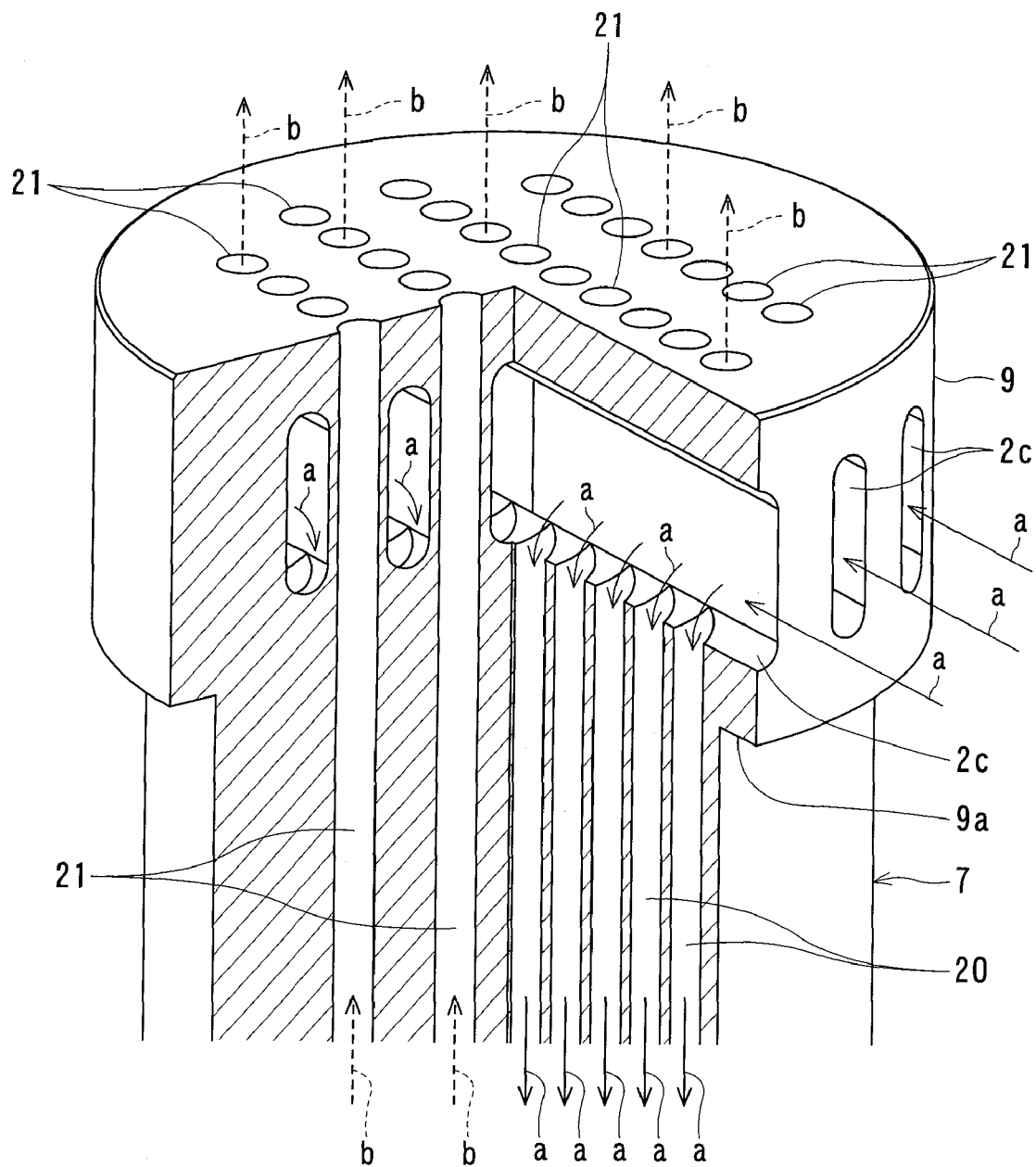
FIG. 6 is a perspective view of the structure of flow channels in the upper portion of the ceramic blocks according to the first embodiment of the present invention.
Figure 7:
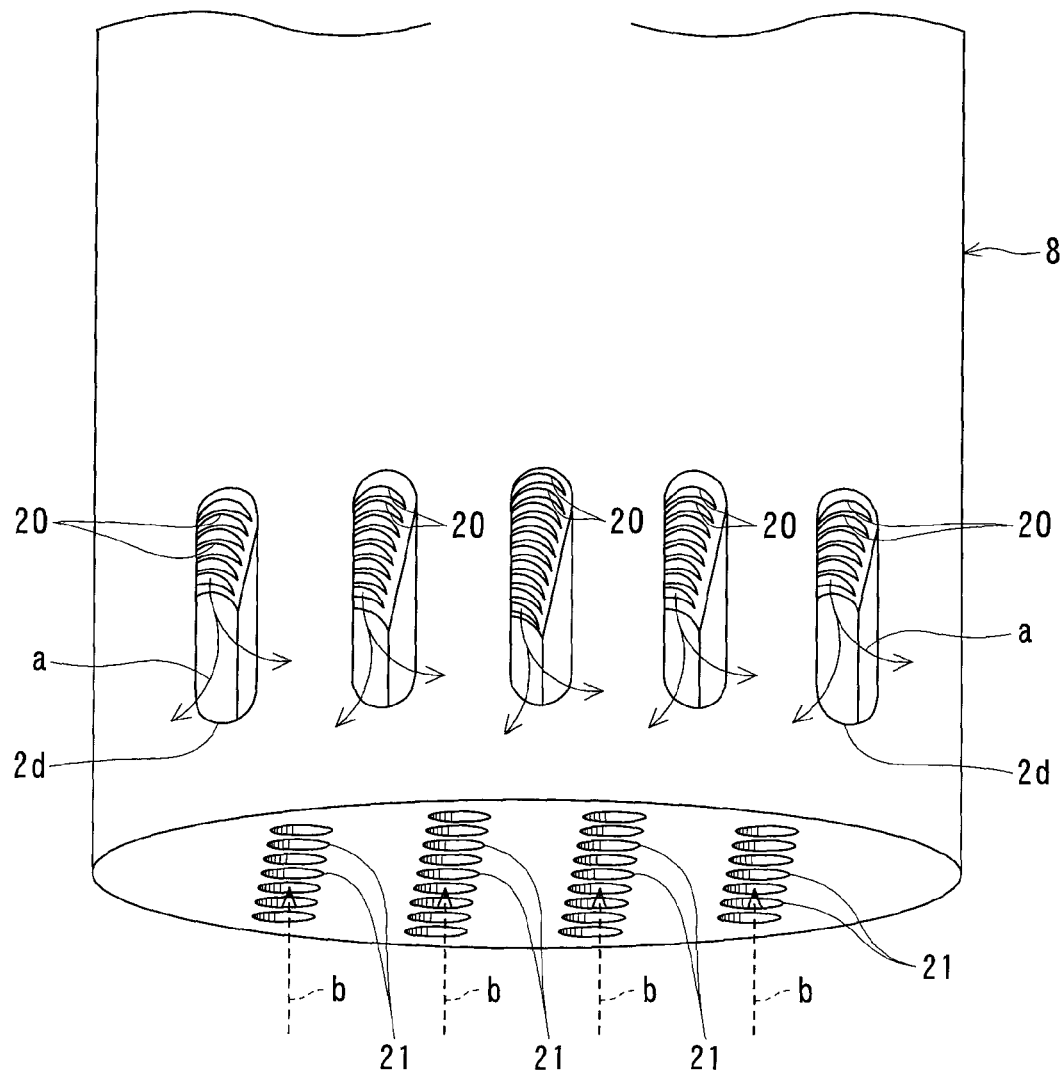
FIG. 7 is a perspective view of the structure of flow channels in the lower portion of the ceramic blocks according to the first embodiment of the present invention.

Thus, the ceramic blocks 7 and 8 have flow channels arranged in lines, and the flow channels 20 for helium gas "a" (fluid A) and the flow channels 21 for sulfuric acid (fluid B) are disposed in each two adjacent lines, respectively. The helium flow channels 20 are closed, but the sulfuric acid flow channels 21 are opened at the upper end and lower end of the stack of ceramic blocks 7 and 8 having the helium inlets 2c and the helium outlets 2d. More specifically, the helium inlets 2c, which are horizontal holes communicating with the helium flow channels (lines A), are formed in the peripheral wall of the large-diameter head 9 at the upper end of the upper block 7, as shown in FIGS. 2 and 6. The helium outlets 2d, which are horizontal holes communicating with the helium flow channels (lines A), are formed in the peripheral wall of the lower block 8 at the lower end, as shown in FIGS. 2 and 7.

Figure 8C:
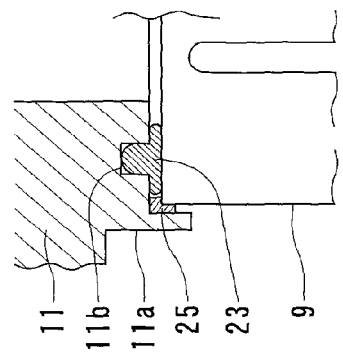
FIG. 8C is an enlarged sectional view of the main parts of the heat exchange section shown in FIG. 8A after being assembled.
Figure 8B:
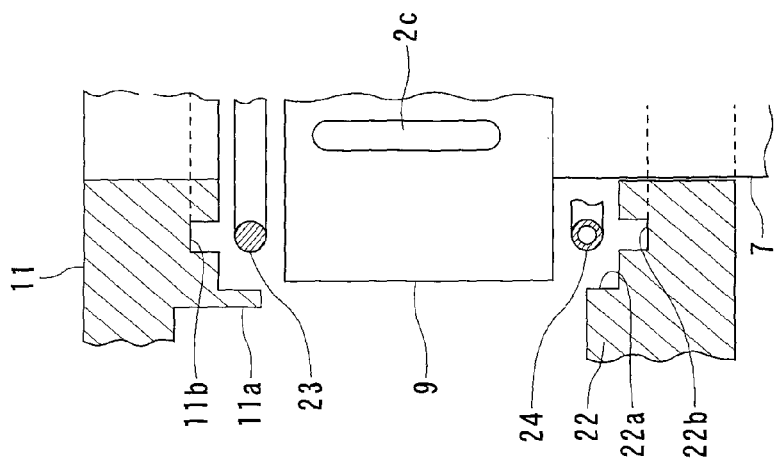
FIG. 8B is an enlarged sectional view of the main parts of the heat exchange section shown in FIG. 8A before being assembled.
Figure 8A:
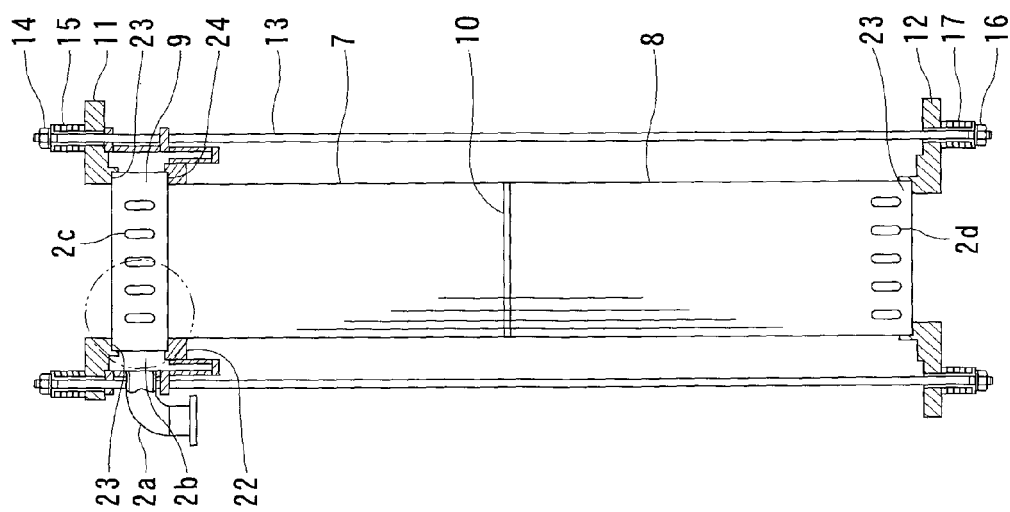
FIG. 8A is a partial sectional view of the heat exchange section of the ceramic heat exchanger according to the first embodiment of the present invention.

FIG. 8A is a side view of the joining structures of the ceramic blocks 7 and 8 and the upper end plate 11 and lower end plate 12, partially shown in sectional view. As shown in FIG. 8A, the helium inlets 2c are formed in the peripheral wall of the large-diameter head 9 of the upper block 7, and the helium inlet container 2b is provided so as to cover the helium inlets 2c. The helium inlet container 2b includes a metal upper end plate 11, an auxiliary end plate 22 disposed under the upper end plate 11 so as to oppose to the same, and an end portion of the helium introduction pipe 2a. Helium gas is delivered to the helium inlets 2c with a closed space defined by the edge of the peripheral wall of the upper end plate 11.

FIGS. 8B and 8C show the sealed structure between the large-diameter head 9 of the upper block 7 and the upper end plate 11 and between the large-diameter head 9 and the auxiliary end plate 22. As in FIG. 8B showing a state before assembling, a flap 11a extends downward from the circumference of the lower surface of the upper end plate 11, thus surrounding the large-diameter head 9 of the upper block 7. A ring-shaped sealing groove 11b facing downward is formed in the lower surface of the upper end plate 11 inside the flap 11a. A ring-shaped sealing member 23 is fitted in the sealing groove 11b. The sealing member 23 is made of gold or other metal plated with gold.

Further, a vertical wall 22a protruding from the circumference of the upper surface of the auxiliary end plate 22 surrounds the large-diameter head 9 of the upper block 7, as shown in FIG. 8B. A ring-shaped sealing groove 22b is formed in the upper surface of the auxiliary end plate 22 inside the vertical wall 22a. A ring-shaped hollow sealing member 24 is fitted in the sealing groove 22b. The sealing member 24 is made of, for example, inconel plated with silver.

When the upper end plate 11 is joined to the large-diameter head 9 of the ceramic block 7, as shown in FIG. 8C, the sealing member 23 is squashed to fill the groove 11b, and thus hermetically seals the gap between the upper end plate 11 and the large-diameter head 11 to block fluids. The sealing member 24 between the auxiliary end plate 22 and the large-diameter head 9 of the upper block 7 functions in the same manner as that mentioned above.

Preferably, a metal cushion 25 is disposed around the periphery of the sealing member 23 for protecting the peripheral edge of the ceramic large-diameter head 11, as shown in FIG. 8C.

Preferably, in the present embodiment, the ceramic blocks 7 and 8 are made of silicon carbide or silicon nitride if sulfuric acid is used as a fluid. These materials are suitable in view of corrosion resistance, high-temperature strength, and thermal conductivity.

Sealing mechanisms that can absorb thermal expansion difference are provided to portions of the pressure vessel 1 through which the sulfuric acid introduction pipe 3a and the sulfuric acid gas exhaust pipe 3d extend respectively.

The present embodiment will be operated in a manner described hereunder.

Sulfuric acid "b" of about 455° C. supplied from a sulfuric acid supply system (not shown) is introduced from the sulfuric acid introduction pipe 3a and flows into the lower plenum 3b and then through the sulfuric acid flow channels (lines B) 21 formed in the ceramic blocks 7 and 8. The sulfuric acid "b" running through the flow channels 21 is heated by heat exchange using the walls of the flow channels in the ceramic blocks 7 and 8 heated by high-temperature helium "a" flowing downward as the opposing flaw, and arrives at the upper plenum 3c. The resulting sulfuric acid gas is discharged through the sulfuric acid gas exhaust pipe 3d to a Bunsen reaction system (not shown).

The high-temperature helium gas "a" of about 689° C. supplied from a high-temperature gas furnace heat exchange system (not shown) flaws into the helium inlet container 2b of the heat exchange section 6 from the helium inlet nozzle 2 and through the helium introduction pipe 2a. Both ends of the helium inlet container 2b are sealed by the end plate and the large-diameter head 9 of the upper block 7 with the sealing member 23. In other words, one end of the helium inlet container 2b is sealed by the large-diameter head 9 of the upper block 7 with the sealing member 23. The high-temperature helium gas delivered into the helium inlet container 2b flows into the helium flow channels 20 through the helium inlets 2c formed in the peripheral wall of the upper portion of the upper block 7 and further flows downward in the ceramic blocks 7 and 8, thus discharging through the helium outlets 2d formed in the peripheral wall of the lower portion of the lower block 8 into the pressure vessel 1. The discharged helium gas "a" flows up in the pressure vessel 1 while afterheating the ceramic blocks 7 and 8, thus returning to the high-temperature gas furnace heat exchange system through the helium outlet nozzle 4.

According to the above-described first embodiment, some lines, each defined by a plurality of flow channels, are formed in the ceramic block 7, and the respective two adjacent lines are defined by flow channels for helium (fluid A) "a" and flow channels for sulfuric acid (fluid B) "b", respectively. The helium flow channels 20 are blocked, but the sulfuric acid flow channels 21 are opened at the ends of the stack of ceramic blocks 7 and 8 where the helium inlets 2c or helium outlets 2d are provided. Thus, the heat exchange between the opposing flaws can be achieved between helium gas "a" and sulfuric acid "b" in the ceramic blocks 7 and 8. Consequently, the opposing area becomes larger than that of orthogonal flaws.

In addition, unlike the known structure, it is not necessary to locate the partition plates and the inner tube, and the leakage of helium resulting from the thermal expansion difference can be greatly reduced. Furthermore, one end of the helium inlet container 2b is sealed by the large-diameter head 9 of the upper block 7 with the sealing member 23. Thus, the thermal expansion difference in the diameter direction between the helium inlet container 2b and the upper block 7 can be absorbed by the slippage between large-diameter head 9 and the sealing member 23, so that helium gas "a" can reliably sealed even at a high temperature. Thus, the heat exchange area can be increased while the leakage of helium gas "a" from bypasses can be reduced. Accordingly, the efficiency in heat exchange is extremely increased.

The heat exchange section 6 includes a stack of a plurality of ceramic blocks 7 and 8 with the seal 10 therebetween. The ceramic blocks 7 and 8 are integrated by binding the end plates 11 and 12 disposed with cushions 23 and 24 at the top and bottom of the stack of the ceramic blocks 7 and 8 by the tie rods 13 with the thermal expansion absorbers 15 and 17. Thus, a desired size can be achieved according to the thermal expansion capacity independently of manufacturing equipment, such as a sintering furnace, by stacking the ceramic blocks 7 and 8 with the seal therebetween.

Since the thermal expansion absorbers 15 and 17 are used when the ceramic blocks 7 and 8 are joined and integrated, they can be reliably sealed even if a thermal expansion difference is caused between the ceramic blocks 7 and 8 and the tie rods 13 during the use at a high temperature.

The tie rods 13 can be made of a material exhibiting a high strength at high temperature and having a linear expansion coefficient lower than that of stainless steel or inconel, relatively close to that of the ceramic blocks 7 and 8. Suitable tie rod materials may include molybdenum, molybdenum alloys, titanium alloys, and tungsten.

The end plates 11 and 12 are preferably made of a material having a linear expansion coefficient between the linear expansion coefficients of the ceramic blocks 7 and 8 and the upper and lower plenums 3c and 3b, such as a titanium alloy, molybdenum, or a molybdenum alloy, from the viewpoint of reducing the thermal expansion difference in the diameter direction.

The binding with the tie rods 13 may deform the end plates 11 and 12 to lean and come into contact with the ceramic blocks 7 and 8, and consequently, Hertz stress concentration may produce an indentation or a crack. Such an indentation or a crack may expand to result in destruction. However, the cushions 25 disposed between the ceramic blocks 7 and 8 and the end plates 11 and 12 can alleviate the stress concentration to enhance the structural soundness. The material of the cushion 25 must be resistant to high temperature, corrosion-resistant to sulfuric acid "b", and ductile. Gold satisfies these requirements. If sulfuric acid "b" does not come into contact the cushion 25, it may be made of silver.

The present embodiment as described above can provide a highly reliable ceramic heat exchanger exhibiting high heat exchange efficiency and structural soundness even though a corrosive fluid, such as sulfuric acid, flows at a high temperature.

Second Embodiment

Figure 9:
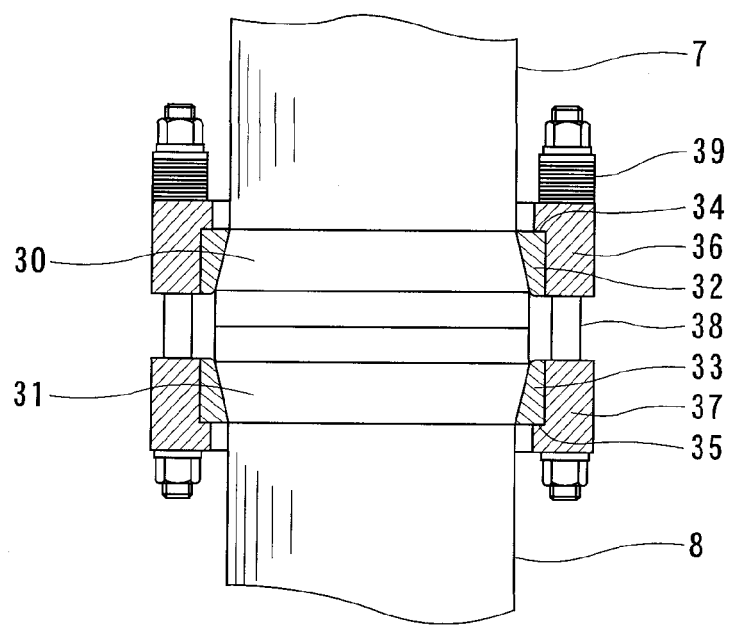
FIG. 9 is a sectional view of an exemplary structure of the main parts of a tightening portion according to a second embodiment of the present invention.
Figure 10:
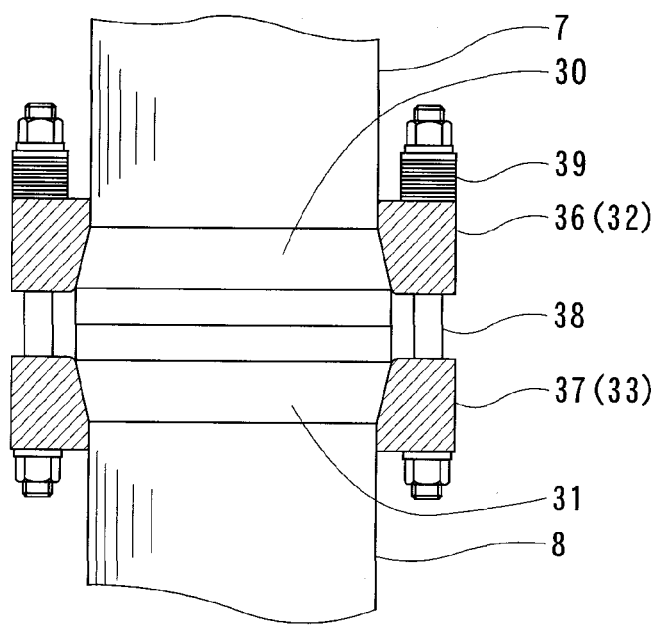
FIG. 10 is a sectional view of a modification of the second embodiment of the present invention.

FIGS. 1, 9, and 10

This second embodiment represents a ceramic heat exchanger in which at least one of the ceramic blocks 7 and 8 has tapered portions 30 and 31 at the junction end at which the ceramic blocks 7 and 8 are joined. The tapered portions 30 and 31 have a diameter gradually increases toward the end. The peripheries of the tapered portions 30 and 31 are fitted with tapered rings 32 and 33, respectively. Flanges 36 and 37 having steps 34 and 35 to which the edges of the tapered rings 32 and 33 are seated are provided, and the flanges 36 and 37 are tightened to each other by means of a plurality of tie rods 38. The same parts as in the first embodiment are designated by the same reference numerals and the duplicated description will be omitted herein.

FIG. 9 is a specific representation of a tightening portion for tightening the ceramic blocks 7 and 8 as an example of the present embodiment.

In the present embodiment, as shown in FIG. 9, the ceramic blocks 7 and 8 have tapered portions 31 and 32 at their respective ends. The peripheries of the tapered portions 31 and 32 are fitted with tapered rings 32 and 33, respectively.

Flanges 36 and 37 having steps 34 and 35 onto which the edges of the tapered rings 32 and 33 are seated are provided around the peripheries of the tapered rings 32 and 33, respectively. The flanges 36 and 37 are tightened to each other by means of a plurality of tie rods 38 with thermal expansion absorbers 39.

The thermal expansion absorbers 39 may be springs, such as coned disk springs or coil springs, or elastic tubes.

Since in this structure, the tapered rings 32 and 33 are fitted to the ceramic blocks 7 and 8 along the tapers, a compressive stress is placed on the tapered portions 30 and 31 while bending moment resulting from tightening is prevented. Consequently, the breakage of the ceramic blocks 7 and 8 made of a brittle material can be prevented.

Since the edges of the tapered rings 32 and 33 are seated onto the steps 34 and 35 of the flanges 36 and 37, respectively, it becomes possible to absorb the thermal expansion difference in the diameter direction between the flanges 36 and 37 and the tapered rings 32 and 33 depending on the materials. Furthermore, the thermal expansion difference in the axial direction can be also absorbed by the thermal expansion absorbers 39.

The tapered rings 32 and 33 can be suitably made of a material having a linear expansion coefficient close to that of the ceramic blocks 7 and 8. Most preferably, the same material as that of the ceramic blocks 7 and 8 is used. In addition, materials having a linear expansion coefficient close to that of the ceramic blocks, such as molybdenum and molybdenum alloys, can reduce the absorption-required thermal deformation of the thermal expansion absorber 39.

If each of the tapered rings 32 and 33 is divided into at least two pieces in the circumferential direction, the tapered rings 32 and 33 and the flanges 36 and 37 can be provided from the tapered ends of the ceramic blocks 7 and 8.

FIG. 10 shows a second structure according to this second embodiment. In this structure, the tapered rings 32 and 33 and the flanges 36 and 37 that are fitted to the peripheries of the tapered portions 30 and 31 formed at the respective ends of the ceramic blocks 7 and 8 shown in FIG. 9 are integrated into respective one-piece bodies, as shown in FIG. 10. The one-piece bodies of the tapered rings 32 and 33 and the flanges 36 and 37 are bound with a plurality of tie rods.

Since, in this structure, the ceramic blocks are fitted with the tapered rings along the tapers as shown in FIG. 9, a compressive stress is caused on the tapered portion while bending moment resulting from tightening is prevented. Consequently, the breakage of the ceramic blocks 7 and 8 made of a brittle material can be prevented.

As described above, the second embodiment of the present invention improves the productivity and the structural soundness as well as producing the same effects as those attained by the first embodiment, and therefore, can provide a highly reliable ceramic heat exchanger exhibiting a high heat exchanging efficiency.

The tapered ring is preferably made of the same material as that of the ceramic block. It is also preferable that the tapered ring is divided into two pieces in the circumferential direction. The tapered ring is preferably made of either molybdenum or a molybdenum alloy.

Third Embodiment

FIGS. 1 and 11 to 13

This third embodiment represents a ceramic heat exchanger having a plurality of ceramic blocks 7 and 8 stacked one on top of the other with a disassemblable seal 10 therebetween. End plates 11 and 12 are disposed outside the stack of the ceramic blocks 7 and 8 and bound with a plurality of tie rods 13 to join and integrate the ceramic blocks 7 and 8. Spacers 40 made of a material in the same series as the tie rods 13 or a material having a higher thermal expansion coefficient than the tie rods 13 are disposed between the end plate 12 and the end portions of the tie rods 13.

The linear expansion coefficient of ceramic, such as silicon carbide or silicon nitride, is about $4E-6/°C$. and is lower than that of metals such as stainless steel or inconel. Consequently, the structure of the first or second embodiment in which a plurality of ceramic blocks 7 and 8 are joined and integrated with the seal 10 therebetween produces a thermal expansion difference at a high temperature. Accordingly, the tie rod 13 is suitably made of a material exhibiting a high strength at a high temperature and has a linear expansion coefficient lower than that of the stainless steel and inconel, close to that of the ceramic blocks. Such materials may include molybdenum, molybdenum alloys, titanium alloys, and tungsten. For the sake of references, linear expansion coefficients at $500°C$. are listed below.

Stainless steel: $18E-6/°C$.
Inconel: $15E-6/°C$.
Titanium alloy: $10E-6/°C$.
Molybdenum: $6E-6/°C$.

It is required that sulfuric acid gas is sealed in the stack of the ceramic blocks 7 and 8 with the seal 10 therebetween by binding the end plates 11 and 12 disposed at both ends of the stack of the ceramic blocks 7 and 8 with the tie rods 13. Unfortunately, a large thermal expansion difference occurs between the metal tie rods 13 and the ceramic blocks 7 and 8. When, for example, the end plates 11 and 12 are made of molybdenum and the tie rods have a length of 1500 mm, the thermal expansion difference in the axial direction becomes as large as about 1.4 mm at a temperature of $500°C$.

In the first and second embodiments, such a large thermal expansion difference is absorbed by the coned disk springs acting as thermal expansion absorbers 17. However, the spring force is reduced at a high temperature, and accordingly, the tightening force is reduced. Consequently, the pressure at the sealing surfaces is reduced to cause leakage.

In addition, a large thermal expansion difference occurs between the metal end plates 11 and 12 and the ceramic blocks 7 and 8. When, for example, the end plates are made of stainless steel and the seal 10 has a radius of 200 mm, the thermal expansion difference in the radius direction becomes as large as about 1.3 mm at a temperature of $500°C$.

In use of conventionally used metal O rings or metal gaskets, such a large thermal expansion difference in the radius direction is absorbed by slipping the O rings or gaskets on the sealing surfaces. However, the slip on the sealing contact surfaces reduces the pressure at the sealing surfaces and varies the contact state to cause leakage.

In view of the above disadvantage, the present embodiment can achieve a thermal expansion-absorbing structure that can absorb thermal expansion even at a high temperature and provide a highly reliable high-performance ceramic heat exchanger that can be easily produced.

Figure 11:
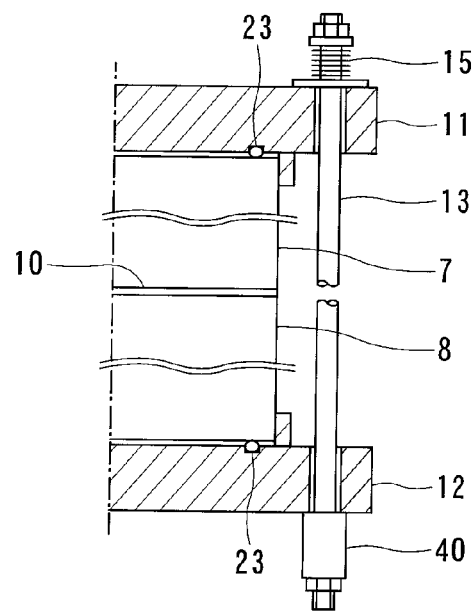
FIG. 11 is a representation of a structure absorbing thermal expansion in the axial direction of a ceramic heat exchanger according to a third embodiment of the present invention.

FIG. 11 shows a structure capable of absorbing thermal expansion in the axial direction of a ceramic heat exchanger according to this third embodiment.

As shown in FIG. 11, the ceramic blocks 7 and 8 are stacked one on top of the other with the seal 10 therebetween. An upper end plate 11 is disposed on the top of the upper block 7, and a lower end plate 12 is disposed under the bottom of the lower block 8. The upper and lower end plates 11 and 12 are bound with the tie rods 13, so that the ceramic blocks 7 and 8 are integrated into one body.

In this structure, the present embodiment may use coned disk springs, flat spring, coil spring, or the like as thermal expansion absorbers 15 for absorbing the thermal expansion difference between the ceramic blocks 7 and 8 and the tie rods 13 at the upper end plate 11 side.

In addition, spacers 40 made of a material having higher thermal expansion coefficient than the tie rods 13 are provided at the lower end plate 12 side as another thermal expansion absorber for absorbing the thermal expansion difference between the ceramic blocks 7 and 8 and the tie rods 13. The spacers 40 are disposed, for example, between the lower end plate 12 and the lower ends of the tie rods 13.

The spacer 40 produces a thermal expansion difference from the tie rod 13 at high temperatures. The thermal expansion difference bends the coned disk spring for the decrease in spring constant of the coned disk spring, and thus, the pressure at the sealing surface is prevented from decreasing effectively.

Figure 12A:
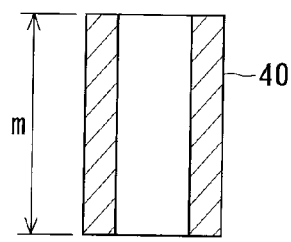
FIG. 12A is an enlarged sectional view of an example of the thermal expansion absorber shown in FIG. 11.
Figure 12B:
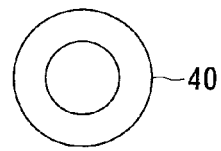
FIG. 12B is a plan view of the absorber shown in FIG. 12A.

When the spacer 40 has a length of "m", as shown in FIGS. 12A and 12B, and a thermal expansion coefficient of $\alpha S$; the ceramic blocks 7 and 8 has a length of L and a thermal expansion coefficient of $\alpha C$; and the tie rods 13 have a thermal expansion coefficient of $\alpha t$, the thermal expansion difference between the ceramic blocks 7 and 8 and the tie rods can be reduced to zero by setting "m" to be substantially equal to $L(\alpha t - \alpha C)/(\alpha S - \alpha t)$. Consequently, the coned disk springs become unnecessary. If the coned disk springs are used, the pressure at the sealing surfaces can be increased more than in the case at a room temperature.

The spacer 40 is disposed so as to opposite to the coned disk spring in the structure shown in FIG. 11. However, it may be disposed between the end plate 11 at the coned disk spring side and the end of the tie rod 13.

Figure 13:
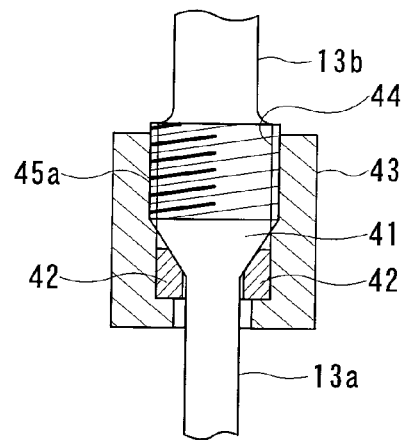
FIG. 13 is a sectional view of a modification of a tie rod as the tightening means according to the third embodiment of the present invention.

The thermal expansion difference can be reduced to zero by forming the tie rod 13 of a ceramic in the same series as the ceramic of the ceramic blocks 7 and 8. It is, in this instance, difficult to provide a screw to the ceramic tie rod 13a so as to be used as a tightening member. Accordingly, a holder 43 having a diameter gradually increased is provided at the end of the ceramic tie rod 13a with a double-split tapered ring 42 having a tapered inner surface along the external surface of the holder 43 so that the tapered ring 42 forms a constant outer diameter, as shown in FIG. 13. The tapered ring 42 is placed in a cylindrical metal holder 43 acting as a tightening member so that end of the ceramic tie rod 13a is held in the holder 43 at one side. The other side of the holder 43 is provided with an internal thread 44.

A short metal tie rod 13b having an external thread 45a at its end is secured in the holder 43 by means of screw. Thus, the ceramic tie rod 13a and the metal tie rod 13b are joined to each other so as to function as a ceramic block tightening member.

Thus, this third embodiment achieves a thermal expansion absorbing structure that can absorb thermal expansion at high temperatures, and provide a highly reliable, high-performance ceramic heat exchanger that can achieve easy production.

Fourth Embodiment

Figure 14:
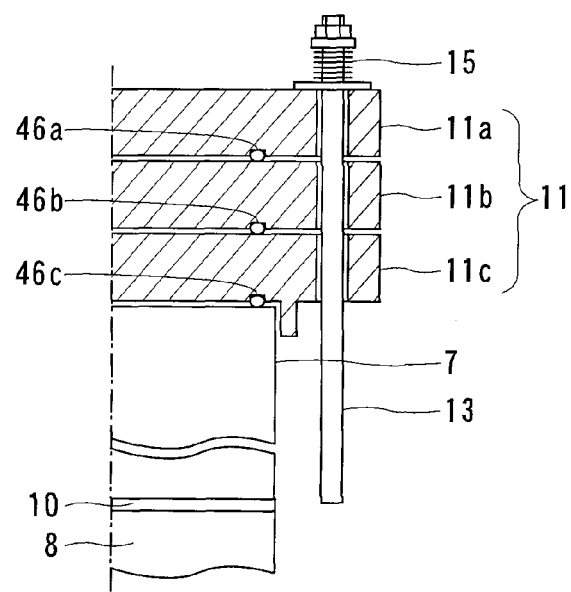
FIG. 14 is a representation of a structure absorbing thermal expansion in the axial direction of a ceramic heat exchanger according to a fourth embodiment of the present invention.

FIGS. 1 and 14

This fourth embodiment represents a ceramic heat exchanger having a plurality of ceramic blocks 7 and 8 stacked one on top of the other with a disassemblable seal 10 therebetween. End plates 11 are disposed outside the stack of the ceramic blocks and bound together with a plurality of tie rods to join and integrate the ceramic blocks. The end plate 11 includes a plurality of metal plates 11a, 11b, 11c, etc. having different thermal expansion coefficients that are stacked one on top of another with sealing members 46a, 46b, 46c, etc. therebetween.

The same parts as in the first embodiment are designated by the same reference numerals and the duplicated description is omitted herein.

FIG. 14 is a specific representation of tightening means for the ceramic blocks 7 and 8. As shown in FIG. 14, the metal plates 11a, 11b, and 11c having different thermal expansion coefficients are stacked one on top of another in the present embodiment. These metal plates 11a, 11b, and 11c are arranged in decreasing order of thermal expansion coefficient toward the ceramic blocks 7 and 8. This structure of the end plate 11 can reduce the slip of the seal 10 resulting from the thermal expansion of the ceramic blocks in the diameter direction.

Although FIG. 14 shows the end plate 11 which is a stack of three plates 11a, 11b, and 11c, the number of plates of the end plate 11 is not particularly limited thereto.

As described above, the present embodiment provides a thermal expansion-absorbing structure that can absorb thermal expansion difference at a high temperature, and provide a highly reliable, high-performance ceramic heat exchanger that can be easily produced.

Fifth Embodiment

Figure 15:
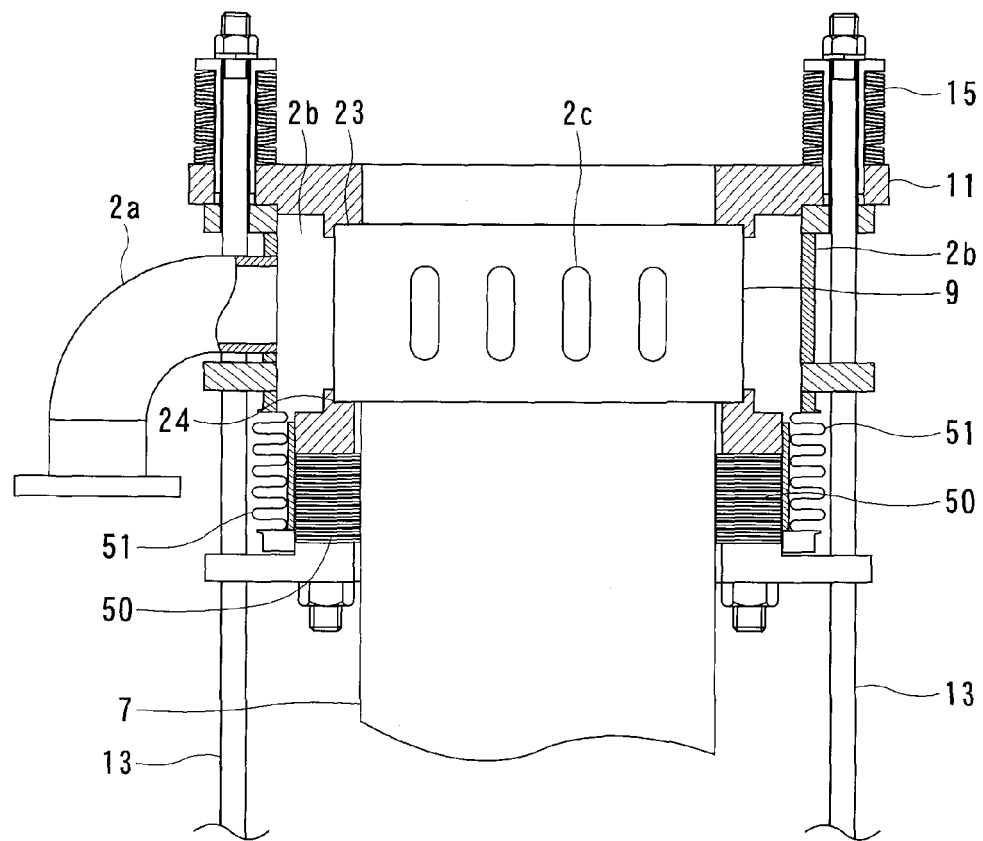
FIG. 15 is a sectional view of a structure absorbing thermal expansion in the axial direction of a ceramic heat exchanger according to a fifth embodiment of the present invention.

FIGS. 1 and 15

This fifth embodiment represents a ceramic heat exchanger including a heat exchange section 6 defined by the stack of ceramic blocks 7 and 8 having a large-diameter head 9 at a predetermined position at an end in the axial direction of the stack, and a helium inlet container 2b having bellows 51 that absorb the thermal expansion difference in the axial direction and disposed around a sealing member 24 abutting against the large-diameter head 9 and springs 50 pressing the sealing member 24 against the large-diameter head 9.

The sealing member 24 and the helium inlet container 2b used in the present embodiment have the same structures as those shown in FIGS. 8A and 8B. For other parts, the same parts as in the first to fourth embodiments are designated by the same reference numerals used in FIGS. 1 to 4 and the duplicated description is omitted herein.

The helium inlet container 2b used in the present embodiment has substantially the same function as that of the first embodiment. The structure of the present embodiment includes the sealing member 24 abutting against the large-diameter head 9, the springs (for example, coned disk springs) 50 pressing the sealing member 24 against the large-diameter head 9, and the bellows 51 disposed around the sealing member 24 and the springs 50 and absorbing the thermal expansion difference in the axial direction, as shown in FIG. 15. Consequently, the springs 50, the bellows 51, and other members prevent effectively the reduction of pressure at the sealing surfaces that may be caused by a thermal expansion difference between the ceramic blocks 7 and 8 and the helium inlet container 2b at a high temperature.

More specifically, the helium inlet container 2b is disposed around the large-diameter head 9 of the upper block 7. The upper end of the container is hermetically connected to the upper end plate 11, and the lower end of the container is abutted on the large-diameter head 9 of the upper block 7 with the sealing member 24. The sealing member 24 is pressed against the large-diameter head 9 by the coned disk springs 50 disposed inner side of the helium inlet container 2b. This structure can prevent effectively the reduction of the pressure at the sealing surfaces that may be caused by a thermal expansion difference between the ceramic blocks and the helium inlet container 2b at a high temperature.

While the present embodiment uses coned disk springs as the springs 50, flat springs, coil springs, or the like may be used. The bellows 51 are provided to the helium inlet container 2b to absorb the thermal expansion difference in the axial direction or the deflection resulting from the tightening of the coned disk springs, thus easily forming the helium inlet container 2b.

As described above, the present embodiment provides a thermal expansion-absorbing structure that can absorb thermal expansion difference at high temperature, and provide a highly reliable, high-performance ceramic heat exchanger that can be easily produced.

Sixth Embodiment

FIGS. 1 and 16 to 20

This sixth embodiment represents a ceramic heat exchanger having a plurality of ceramic blocks 7 and 8 stacked one on top of the other with disassemblable seals 10 therebetween. End plates 11 and 12 are disposed outside the stack of the ceramic blocks 7 and 8 and bound together with a plurality of tie rods 13 to join and integrate the ceramic blocks. The seals 10, which are made of a metal, are disposed around the flow channels 20 or 21 of at least either fluid A or fluid B.

Figure 16A:
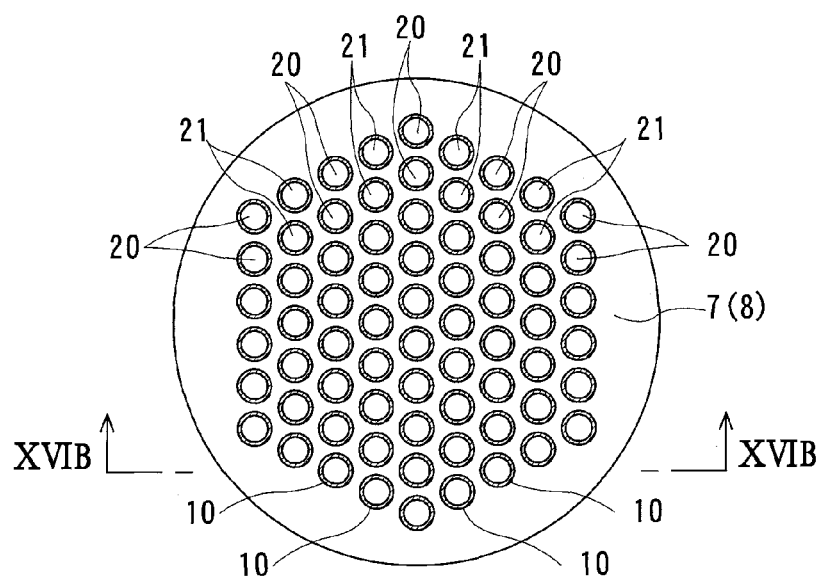
FIG. 16A is a representation of the arrangement of seals at the joining surface of the ceramic blocks of a ceramic heat exchanger according to a sixth embodiment of the present invention.
Figure 16B:
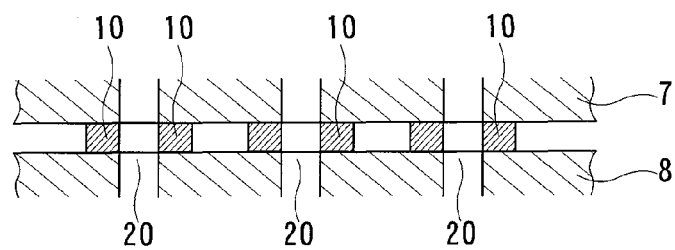
FIG. 16B is a sectional view taken along the line XVIB-XVIB of FIG. 16A.

FIGS. 16A and 16B are representations of the arrangement of the seals at the junction between the ceramic blocks of the ceramic heat exchanger according to this sixth embodiment.

As shown in FIGS. 16A and 16B, helium flow channels 20 and sulfuric acid flow channels 21, which are arranged in their respective lines, are formed in the ceramic blocks 7 and 8. In the present embodiment, a plurality of seals 10 are disposed according to each of the helium flow channels 20 and sulfuric acid flow channels 21. The seal 10 has a shape shown in FIGS. 17 to 19.

Figures 17A, 17B:
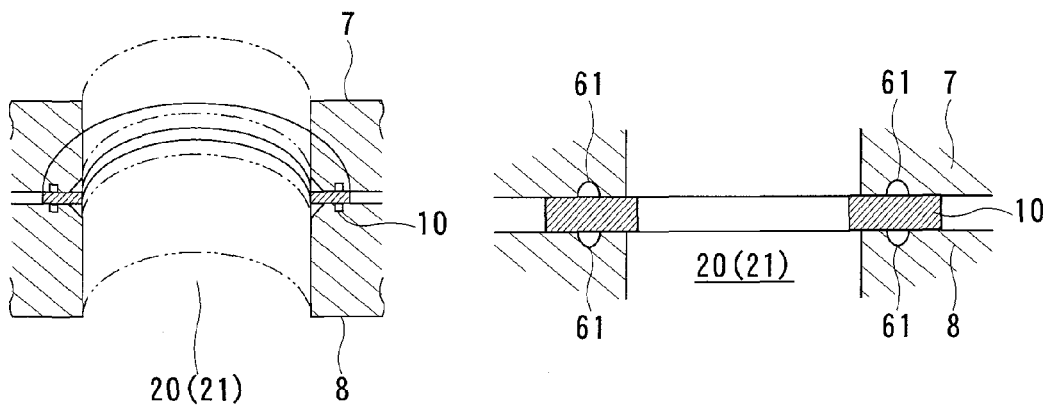
FIG. 17A is a representation of an example of the seal according to the sixth embodiment of the present invention.
FIG. 17B is an enlarged view of the main parts around the seal shown in FIG. 17A.

The seal 10 shown in FIGS. 17A and 17B is a flat doughnut ring and its internal circumference protrudes toward the inside of the flow channel 20 or 21. Ring-shaped grooves 61 are formed in the lower surface and the upper surface of their respective ceramic blocks 7 and 8, and each seal 10 is partially embedded into the ring-shaped groove 61 when it is pressed.

The seal 10 undergoes surface pressure concentration at the portion of the seal 10 coming into contact with the inner edges of the flow channel 20 or 21 by pressing the seal 10 at a predetermined force. Thus, the inner edges of the flow channel 20 or 21 are embedded into the groove 61 of the seal 10 to increase the pressure at the sealing surfaces.

In addition, this embodiment can reduce the deformation or displacement caused by a difference in pressure acting on the flow channels 20 and 21. Furthermore, by forming the grooves in the surfaces of the ceramic blocks 7 and 8 coming into contact with the seal, the edges of the groove 61 undergo surface pressure concentration. Thus, the sealing effect is enhanced and the deformation or displacement can be prevented effectively. As alternatives to the grooves 61, protrusions may produce the same effect.

FIGS. 18A and 18B show a seal 10 having a diverging protrusion 62 diverging from the ring-shaped internal circumference so as to increase the width in the thickness direction. The ceramic blocks 7 and 8 have slants 63 at which the diverging protrusion 62 is fitted to the internal surface of the flaw channel 20 or 21. Consequently, this structure can reliably reduce the deformation or displacement of the diverging protrusion 62 caused by a difference in pressure acting on the flow channel 20 or 21. In addition, the diverging protrusion 62 acts as a guide for setting the seal 10 to the ceramic blocks 7 and 8, and accordingly, the mounting workability is enhanced.

FIGS. 19A and 19B show a modification of the seal 10 shown in FIGS. 18A and 18B. The seal 10 has a diverging protrusion as a bushing at which it is fitted to the internal circumference of the flow channel. Thus, the mounting workability is enhanced. Since the bushing-like diverging protrusion 64 is pressed against the inner wall of the flow channel 20 or 21, the sealability may be further enhanced.

Figure 20A:
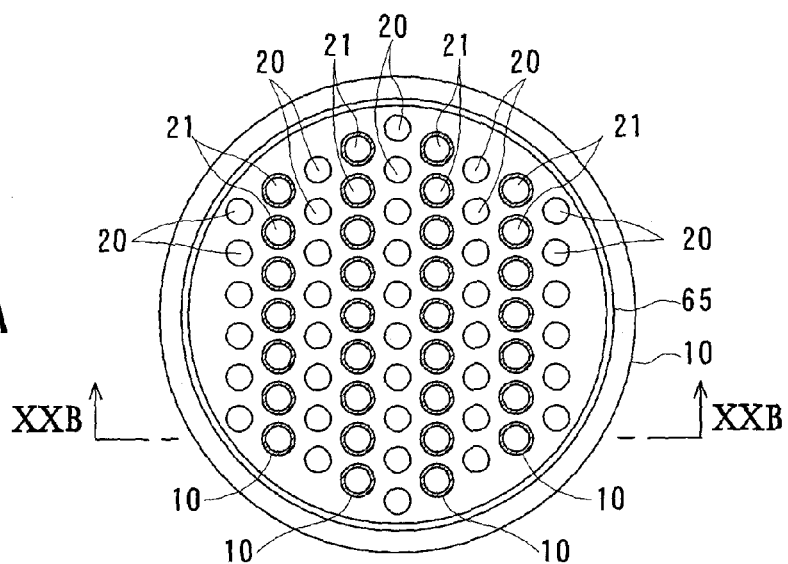
FIG. 20A is a representation of another arrangement of the seal according to the sixth embodiment of the present invention.
Figure 20B:
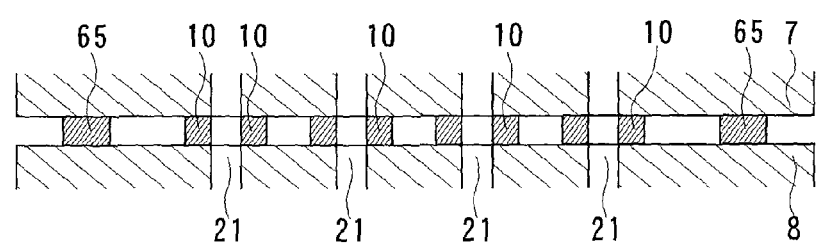
FIG. 20B is a sectional view taken along the line XXB-XXB of FIG. 20A.

While in the above description, the seal 10 is provided to each of all the flow channels 20 and 21, the seal 10 may be provided to each of the sulfuric acid flow channels 21 or the helium flow channels 20, as shown in FIGS. 20A and 20B. In this instance, a second seal 65 is additionally provided at the outside along the periphery of the ceramic blocks 7 and 8.

Instead of disposing the seals 10 around all the flow channels 20 and 21, the seals 10 may be provided for each line of the flow channels.

For use of the ceramic heat exchanger in sulfuric acid equipment, the optimal material of the seal 10 is gold or a metal plated with gold, from the viewpoint of corrosion resistance and sealability. Metals coated with silicon carbide or silicon nitride may be also used in view of corrosion resistance.

For use of the ceramic heat exchanger in equipment other than sulfuric acid equipment, the seal 10 can be made of a material suitable to the conditions in use of the equipment.

The seal 10 can be appropriately selected from the metal seals having elasticity and restoring force, such as metal O-rings, metal C-rings, Helicoflex seals, and resilient seals.

Thus, the present embodiment provides a sealing mechanism capable of being used even under conditions using corrosive fluid such as sulfuric acid at a high temperature, and provides a highly reliable, high-performance ceramic heat exchanger that can be easily produced.

The seal 10 is preferably a flat doughnut ring, and also preferably, has either a groove or a protrusion at the surface of the ceramic blocks with which the seal comes into contact. Preferably, the seal 10 has a diverging protrusion from the internal circumference so as to increase the width in the thickness direction, and the diverging protrusion is fitted to the internal circumference of the flow channel. In addition, the seal 10 is preferably a metal seal having elasticity and restoring force.

Seventh Embodiment

FIGS. 1, 21, and 22

This seventh embodiment represents a ceramic heat exchanger having a plurality of ceramic blocks 7 and 8 stacked one on top of the other with a disassemblable seal 10 therebetween. End plates 11 and 12 are disposed outside the stack of the ceramic blocks 7 and 8 and bound together with a plurality of tie rods 13 to join and integrate the ceramic blocks. The seal 10 has a perforated plate having many holes communicating with the flow channels 20 and 21 for fluids A and B.

Figure 21A:
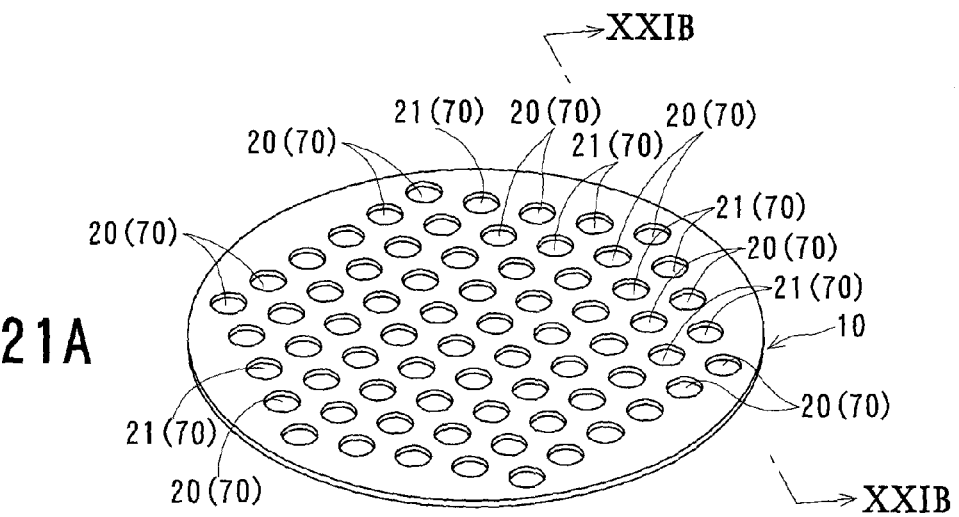
FIG. 21A is a representation of an example of the seal of a ceramic heat exchanger according to a seventh embodiment of the present invention.
Figure 21B:
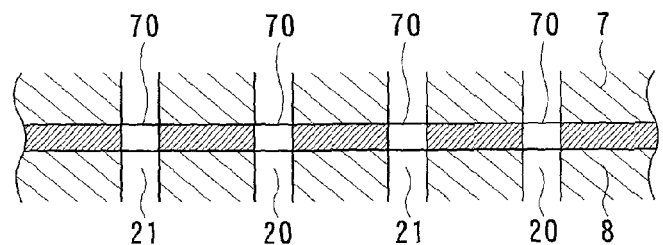
FIG. 21B is a sectional view taken along the line XXIB-XXIB of FIG. 21A.

FIGS. 21A and 21B are representation of an example of the seal 10 of the ceramic heat exchanger. This seal 10 has holes 70 communicating with the flow channels 20 and 21 for fluids A and B, and is disposed between the ceramic blocks 7 and 8. By tightening the ceramic blocks, the flow channels 20 and 21 are sealed separately.

FIGS. 22A and 22B show another seal 10 of the ceramic heat exchanger according to the present embodiment. This seal 10 has bushing-like protrusions 71 fitted into the flow channels 20 and 21. The protrusions thus can reliably prevent the deformation or displacement of the seal 10 resulting from the difference in pressure between the flow channels 20 and 21.

In addition, the protrusions act as guides for setting the seal 10 to the ceramic blocks 7 and 8, thus enhancing the mounting workability.

For use of the ceramic heat exchanger in sulfuric acid equipment, the optimal material of the seal 10 is gold or a metal plated with gold, from the viewpoint of corrosion resistance and sealability. Metals coated with silicon carbide or silicon nitride may be also used in view of corrosion resistance.

For use of the ceramic heat exchanger in equipment other than sulfuric acid equipment, the seal 10 can be made of a material suitable to the conditions in use of the equipment.

Thus, the present embodiment increases the mounting workability as well as attaining of the same effects as those in the sixth embodiment.

In the present embodiment, preferably, the seal 10 is made of either gold or a metal coated with gold. The seal 10 is preferably made of a metal coated with either silicon carbide or silicon nitride.

Eighth Embodiment

FIGS. 1 and 23

This eighth embodiment represents a ceramic heat exchanger having ceramic blocks 7 and 8 in which a plurality of flow channels 20 and 21 extend in the axial direction. End plates 11 and 12 are disposed at both ends of the stack of the ceramic blocks 7 and 8. The end plates 11 and 12 are bound together with a plurality of tie rods 13 with a seal 10 therebetween, and thus, the ceramic blocks 7 and 8 are tightened. Steps 80 engaged with each other with a predetermined difference in diameter are formed at each junction of the end plates 11 and 12 and the ceramic blocks 7 and 8. The engaged steps 80 with the difference in diameter form a space 81 therebetween. A sealing ring 83 having an opening 82 opened in the axial direction is placed in the space 81.

FIG. 23 is a representation of a sealing structure of the junction between the end plate 11 or 12 and the ceramic block 7 or 8 in the ceramic heat exchanger.

In this sealing structure, the steps 80 are formed at the junction between the end plate 11 or 12 and the ceramic block 7 or 8 and are engaged with each other with a predetermined difference in diameter. The engaged steps 80 with a predetermined difference in diameter have a space 81 therebetween, and the sealing ring 83 opened in the axial direction is placed in the space.

A large thermal expansion difference occurs between the end plates 11 and 12, which are made of a metal, and the ceramic blocks 7 and 8 during heat exchange. The sealing structure of the present embodiment allows the sealing ring to deform elastically so as to absorb the large thermal expansion difference in the radius direction.

Specifically, the ends of the sealing ring 83 are squashed on the steps 80 of the ceramic block 7 or 8 and the end plate 11 or 12 to seal the fluid. The thermal expansion in the radius direction can be absorbed by the elastic deformation of the sealing ring 83 without slipping or deforming the contact portion of the sealing ring. Thus, the structure of the present embodiment can prevent the reduction of the pressure at the sealing surfaces resulting from the slip on the contact surface of the seal and the leakage resulting from the change of the contact state. It is preferable to locate the opening 82 at the high pressure side from the view point of increasing the sealability.

Thus, the present embodiment provides a seal capable of absorbing the thermal expansion difference at a high temperature and provides a highly reliable, high-performance ceramic heat exchanger that can be easily produced.

The invention claimed is:
1. A ceramic heat exchanger comprising:
a plurality of ceramic blocks stacked one on top of another, an upper of the ceramic blocks including a head portion and a lower barrel portion below the head portion, the head portion having a larger exterior diameter than the exterior diameter of the lower barrel portion to form a step at an upper end of the larger exterior diameter head portion, and including inlet holes in a peripheral surface of the head portion;
a seal interposed between adjacent of the plurality of ceramic blocks;
a plurality of parallel lines provided for each of the ceramic blocks, each of the lines being defined by flow channels and the lines being arranged in parallel with each other, through which different fluids A and B flow in opposing direction in respective adjacent two of the plurality of parallel lines;
a heat exchange section including the stacked ceramic blocks with the seal being interposed between the adjacent ceramic blocks in a direction in which the lines are formed, a sealing member abutting against the larger exterior diameter head portion, springs pressing the sealing member against the larger exterior diameter head portion, and a helium inlet container including a bellows containing the sealing member and absorbing thermal expansion difference in the axial direction, the helium inlet container is provided for the step formed at the upper end of the larger exterior diameter head portion;
a tightening member including first and second end plates and a tie rod extending between the first and second plates, connecting the first and second end plates, the first and second end plates provided on respective of the first and second ceramic blocks, so as to couple both of end portions of the heat exchange section by the tightening member to join and integrate the ceramic blocks; and
a thermal expansion absorber positioned on outer surface sides of the end plates facing away from the ceramic blocks of the tightening member so as to absorb thermal expansion of the tie rod in an axial direction thereof.
2. The ceramic heat exchanger according to claim 1, wherein each of the ceramic blocks includes a junction end at which the ceramic blocks are joined, at least one of the junction ends including a tapered portion having a diameter gradually increasing toward the at least one junction end, the tapered portion including a tapered ring fitted to a periphery thereof and a flange disposed around the tapered ring, the flange including a step on which an edge of the tapered ring is seated, and a thermal heat absorbing member that absorbs thermal expansion in an axial direction of the tie rod on an outer surface side of the flange.

3. The ceramic heat exchanger according to claim 1, wherein the seal is a disassemblable seal, the stack of ceramic blocks including end plates on external surfaces thereof, the end plates being bound to each other with a plurality of tie rods to join and integrate the ceramic blocks, and wherein spacers made of a same material as of the tie rods or a material having a thermal expansion coefficient higher than that of the tie rods are disposed each between the end plates and the ends of the tie rods.

4. The ceramic heat exchanger according to claim 1, wherein the seal is a disassemblable seal, the stack of ceramic blocks including end plates on external surfaces thereof, the end plates being bound to each other with a plurality of tie rods to join and integrate the ceramic blocks, the seal being disposed around at least either the flow channels for fluid A or the flow channels for fluid B.

5. The ceramic heat exchanger according to claim 1, wherein the seal is a disassemblable seal, the stack of ceramic blocks including end plates on external surfaces thereof, the end plates being bound to each other with a plurality of tie rods to join and integrate the ceramic blocks, the seal being a perforated plate having holes communicating with the flow channels for fluids A and B.

6. The ceramic heat exchanger according to claim 1, wherein the end plates are disposed at both ends of the stack of the ceramic blocks including a plurality of flow channels extending in the axial direction, and the end plates are bound to each other with a plurality of tie rods to tighten and join the ceramic blocks, and wherein steps to be engaged with each other with a predetermined difference in diameter are formed at a junction of the end plates and the ceramic blocks, and the steps define a space therebetween in which a sealing ring including an opening in the axial direction is placed.

* * * * *